(12) United States Patent
Schulz et al.

(10) Patent No.: US 9,374,199 B2
(45) Date of Patent: Jun. 21, 2016

(54) COMMUNICATION NETWORK ELEMENT AND METHOD TRANSMITTING DATA

(75) Inventors: Egon Schulz, München (DE); Wolfgang Zirwas, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 314 days.

(21) Appl. No.: 13/057,007

(22) PCT Filed: Aug. 4, 2009

(86) PCT No.: PCT/EP2009/060119
§ 371 (c)(1),
(2), (4) Date: Feb. 1, 2011

(87) PCT Pub. No.: WO2010/015640
PCT Pub. Date: Feb. 11, 2010

(65) Prior Publication Data
US 2011/0131461 A1    Jun. 2, 2011

(30) Foreign Application Priority Data

Aug. 5, 2008  (EP) ..................... 08104962

(51) Int. Cl.
*H04L 1/18*       (2006.01)
*H04L 1/00*       (2006.01)
*H04L 1/06*       (2006.01)

(52) U.S. Cl.
CPC ............ *H04L 1/1819* (2013.01); *H04L 1/0026* (2013.01); *H04L 1/06* (2013.01); *H04L 2001/0097* (2013.01)

(58) Field of Classification Search
CPC ................................ H04L 1/0026; H04L 1/06
USPC .................................. 714/749, 774
See application file for complete search history.

(56) References Cited

U.S. PATENT DOCUMENTS

| | | | |
|---|---|---|---|
| 8,228,809 B1 * | 7/2012 | Xing et al. | 370/252 |
| 2006/0098568 A1 | 5/2006 | Oh et al. | 370/206 |
| 2006/0239222 A1 | 10/2006 | Kim et al. | 370/328 |
| 2008/0192856 A1 * | 8/2008 | Jongren et al. | 375/267 |
| 2008/0233902 A1 * | 9/2008 | Pan et al. | 455/114.3 |

(Continued)

FOREIGN PATENT DOCUMENTS

| | | |
|---|---|---|
| CN | 101026442 A | 8/2007 |
| CN | 101217304 A | 7/2008 |

(Continued)

OTHER PUBLICATIONS

Chang, Robert W., Precoding for Multiple-Speed Data Transmission, Sep. 1967, The Bell System Technical Journal, pp. 1633-1649.*

(Continued)

*Primary Examiner* — M. Mujtaba K Chaudry
(74) *Attorney, Agent, or Firm* — Harrington & Smith

(57) ABSTRACT

A method of transmitting data in a communication network is provided, wherein the method includes receiving an error message indicating that a data packet precoded by using a first matrix and transmitted a first time by using a cooperative transmission scheme is not decoded correctly, preparing an recoded data packet by precoding the data packet using a second matrix which is different to the first matrix, and retransmitting the recoded data packet.

10 Claims, 6 Drawing Sheets

(56) References Cited

U.S. PATENT DOCUMENTS

2008/0260059 A1* 10/2008 Pan .............................. 375/260
2009/0016354 A1* 1/2009 Isobe ......................... 370/395.4

FOREIGN PATENT DOCUMENTS

| | | |
|---|---|---|
| EP | 1 294 120 A1 | 3/2003 |
| WO | WO 2008/024462 A2 | 2/2008 |

OTHER PUBLICATIONS

Lebrun, G. et al., MIMO Transmission Over a Time-Varying Channel Using SVD, 2002, IEEE, pp. 414-418.*

Tourki, K. et al., Multi-Hop Asynchronous Cooperative Diversity: Performance Anaylsis, Mar. 2008, IEEE, pp. 857-862.*

Agustin, A., et al., "Evaluation of Turbo H-ARQ Schemes for Cooperative MIMO Transmission", © 2004 IEEE, 5 pgs.

* cited by examiner

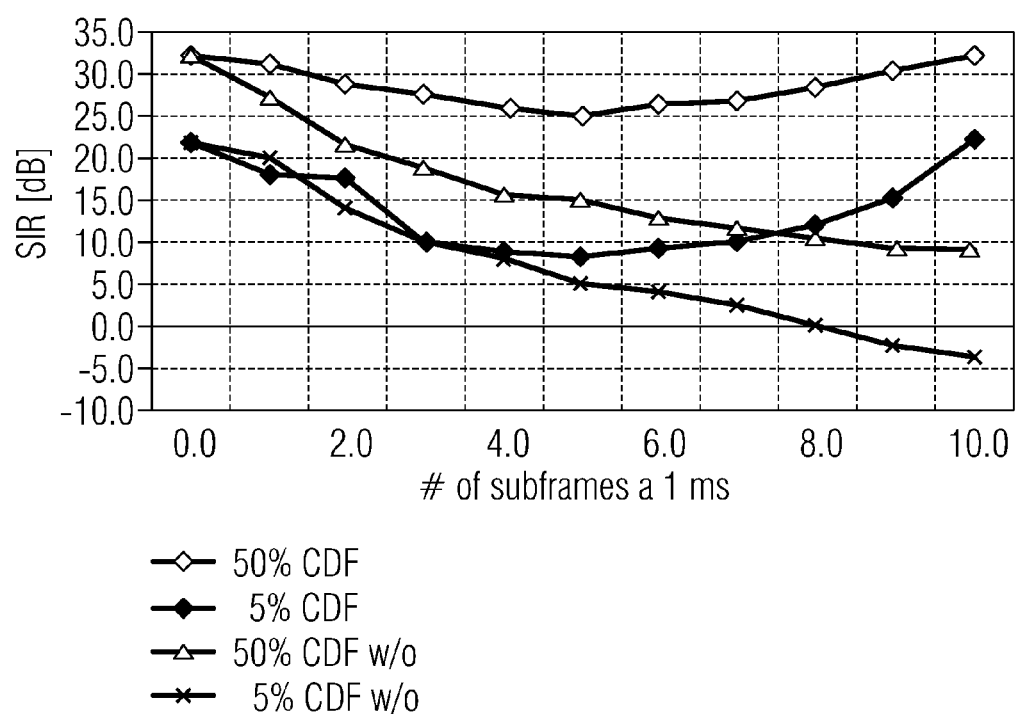

FIG 6A  v=3kmh, w/o interpolation, 140symbols delay, ampl/phase=5/7 bits
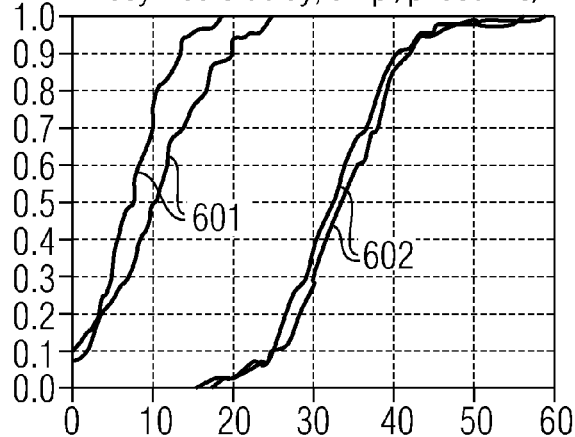
FIG 6B  v=3kmh, Delay=70symbols a 700μs
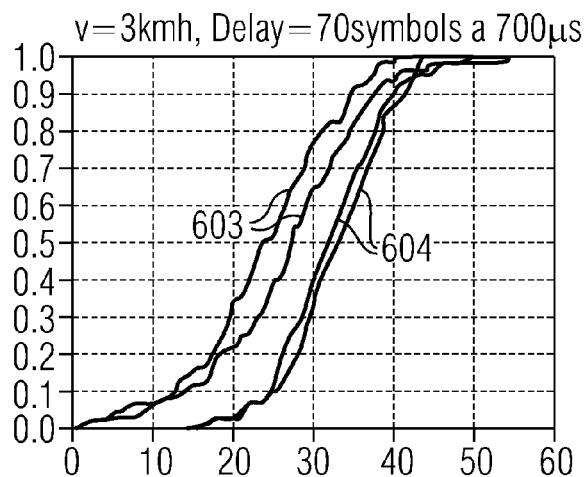
FIG 6C  v=3kmh, Delay=126symbols a 700μs
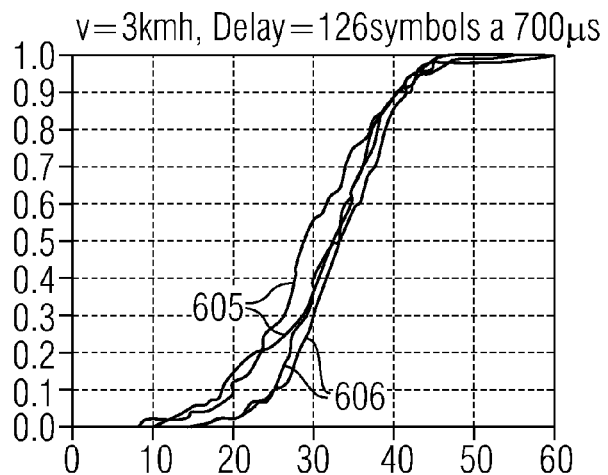

COMMUNICATION NETWORK ELEMENT AND METHOD TRANSMITTING DATA

FIELD OF INVENTION

The present invention relates to the field of communication network elements and methods of transmitting data, in particular, to repeat transmission of data in a communication network. Furthermore, the present invention relates to a communication network system, a program element and a computer readable medium.

ART BACKGROUND

Nowadays mobile communication networks are widely used. These communication networks comprise a plurality of network cells each having at least one base station used to receive and transmit signals from user equipment, e.g. mobile phones or PDAs. A plurality of different environments or systems are known, e.g. GERAN, UTRAN, LTE, E-UTRAN, WCDMA, or WLAN. For ensuring a good performance and in particular a secure data transmission it has to be ensured that all data, data signals, or data packets are received at the intended recipient and at possible relay stations, like base stations of the mobile communication network.

In order to increase the transmission quality so called Hybrid Automatic Repeat Request (HARQ) error correction methods can be employed. When using HARQ the transmitting side consecutively transmits transmission time intervals (TTI) belonging to the HARQ processes. The receive side attempts to decode each process and sends back an acknowledge (ACK) or a non acknowledge (NACK) message or signal, upon which the transmit side either transmits new data in the process and retransmits the data transmitted in the previous cycle of the process, respectively. The receiver soft combines multiple receptions of the same data protocol data unit (PDU).

In particular, one problem limiting the performance of the data transmission known in the prior art is inter cell interference. In order to reduce the inter cell interference some form of cooperative antenna (COOPA) systems are proposed. From theory significant performance gains with respect to capacity and coverage are known for full cooperating cellular radio systems compared to conventional ones. Due to these large gains, which cannot be achieved with other technologies, as it is known from theory that COOPA systems provide an upper bound for interference limited cellular radio systems. At the same time it is clear that full cooperation is not practical due to required channel state information (CSI) to a huge number of base stations (BS) and accordingly large feedback overhead, especially in case of FDD systems. Furthermore, in case of time division duplex (TDD) systems channel reciprocity might relieve feedback overhead a little bit, but for wide area frequency division duplex (FDD) systems this is an important issue. A further topic is the large amount of data on the backbone network, which might generate a lot of costs in terms of CAPEX and OPEX.

Different types of cooperative antenna systems (COOPA) have been proposed in the meantime, but in the following the basic cell of any cooperation area (CA), consisting of two cooperating Node Bs (NBs) and two user equipments (UEs) will be investigated. In case of cooperative transmission generally a central unit (CU) performs common signal precoding, which is basically a matrix multiplication of all data signals with a precoding matrix W. In case of zero forcing (ZF) W is the pseudo inverse $H^+$ of the overall channel matrix H. The simplest form of a CA may be formed by a codebook based precoding. In this case the precoding matrix W is selected from a codebook based on the different preferred matrix indices (PMI) feedbacks PMI1 and PMI2 from the UEs UE1 and UE2.

Generally the radio channel matrix H will be time variant, which leads to a high sensitivity to feedback delay of PMI values. Unfortunately due to processing time at the transmitter as well the receiver and the need to wait for transmission opportunities for the PMI values there will be a delay of several subframes between the time of estimation of the radio channel to the time when the precoding with the precoding matrix W is applied to the user data. In the meantime the radio channel H will have changed so that the precoding will go wrong.

Different proposals exist to reduce overall feedback for MIMO as well as cooperative transmission schemes like subspace schemes, where the real radio channel dimension, which is most often much smaller than the one of the actual radio channel of the transmission is determined and only updates in the subspace dimensions is being sent.

Another direction is to use tracking algorithms, based on the assumption that radio channels will vary smoothly so that the difference between one measurement to the next is small and can be fed back by smaller number of bits.

However, in high performance solutions with significant precoding gains the resulting performance degradations will be severe even for feedback delays of only few ms and even for very moderate mobile speeds.

While these techniques help to reduce feedback the main issue of feedback delay is not solved this way. There more brute force methods are discussed to use fast fibres for inter Node B connections to avoid any additional delay in the processing chain.

Another option would be the definition of a specific fast feedback channel on physical layer similar to that for WCDMA power control.

Thus, there may be a need for a communication network element, a method for transmitting data, a communication network system, a program element, and a computer readable medium providing an improved performance of the communication network, in particular in a cooperative antenna system.

SUMMARY OF THE INVENTION

This need may be met by the subject-matter according to the independent claims. Advantageous embodiments of the present invention are described by the dependent claims.

According to an exemplary aspect of the invention a method of transmitting data in a communication network is provided, wherein the method comprises receiving an error message indicating that a data packet precoded by using a first matrix and transmitted a first time by using a cooperative transmission scheme is not decoded correctly, preparing an recoded data packet by precoding the data packet using a second matrix which is different to the first matrix, and retransmitting the recoded data packet.

In particular, the first matrix and the second matrix may comprise or may consist of so called precoding matrixes. The communication network may be a mobile communication network and may be adapted to perform HARQ processes and/or the error message may be a Non ACKnowledge (NACK) message.

According to an exemplary aspect of the invention a communication network element for transmitting data in a communication network is provided, wherein the network element comprises a detection unit adapted to detect an error message indicating that a data packet transmitted using a cooperative transmission scheme on a first channel is not decoded correctly, a precoding unit adapted to preparing an recoded data packet by precoding the data packet using a second matrix which is different from the first matrix, and a transmission unit adapted to retransmit the recoded data packet.

According to an exemplary aspect of the invention a communication network system is provided, which comprises a plurality of communication network elements, wherein the plurality of communication network elements includes at least two base stations and at least two user equipments, wherein at least one of the plurality of communication network elements is a communication network element according to an exemplary aspect of the invention, and wherein the plurality of communication network elements are adapted to perform a cooperative transmission of data packets. In particular, the communication network system may further comprise a central unit adapted to perform a common precoding for the at least two communication network elements, e.g. for two base stations or Node Bs.

According to an exemplary aspect of the invention a program element is provided, which, when being executed by a processor, is adapted to control or carry out a method according to an exemplary aspect of the invention.

According to an exemplary aspect of the invention a computer-readable medium, in which a computer program is stored which, when being executed by a processor, is adapted to control or carry out a method according to an exemplary aspect of the invention.

In this application the term "data packet" may particularly denote every kind of data which can be transmitted either via cable or line or wireless. In particular, the term "data" may include digital or analogue data relating to a phone call or a transmission of data as used in the connection with computer communications, e.g. programs, pictures, music title, or the like. In particular, the specific data may be formed by one or more data packets. One or more data packets may also be denoted as a data vector.

In this application the term "error message" may particularly denote every kind of message sent by a communication network element to one or a plurality of other communication network elements in case specific data, e.g. a data packet, is not received or decoded correctly at the intended recipient, e.g. due to low signal to noise ratio or due to low signal strength. Such an error message may be a NACK message in the case of a communication network element adapted to perform a so-called Hybrid Automatic Repeat Request (HARQ) error control method. In particular, an error message may be sent in case the specific data can not be decoded, e.g. at least some information transmitted by this specific data is not recoverable.

The term "retransmitting" may particularly denote a second transmission of the data packet, the transmission of additional redundancy for the data packet and/or by using another, possibly optimized, precoding matrix. That is, the term "retransmitting" is not restricted to a pure repetition of the first transmission but means in a broader sense that the transmission is performed again in a way which is designed to increase the probability of a correct decoding of the data packet.

By providing a method according to an exemplary aspect of the invention it may be possible to provide a robust and reliable as well as low overhead feedback scheme in cooperative antenna system. At least movements of moderately high speed may be supported in combination with moderate feedback delays in the order of several ms. Thus, it may be possible to increase the performance of the communication or data transmission by decreasing the feedback delay.

A gist of an exemplary aspect may be seen in providing a method of cooperative data transmission wherein a first transmission of a data packet is performed by using a first precoding matrix, while, after receiving an error message indicating that the first transmission is not decoded correctly at the receiving side, the retransmission is performed using a second matrix. This second matrix is preferably a matrix which takes into account the evolving of the channel or channel matrix in particular in the time span between the calculation of the first matrix and the time of the first transmission. Such a method may overcome significant performance degradations imposed by feedback delay, without using conventional brute force methods. Furthermore, the required feedback overhead may be reduced with only small performance loss, since larger feedback may only be generated if required.

Next, further exemplary embodiments of the method of transmitting data are described. However, these embodiments also apply to the communication network element, the communication network system, the program element, and the computer readable medium.

According to another exemplary embodiment of the method the second matrix is based on a time corrected channel matrix. In particular, the corrected channel matrix may be an optimized channel matrix which, for example, considers time evolution of the channel, which may be determined by a measurement at the time of the first transmission. By using a time corrected channel matrix to calculate or determine the second matrix it may be possible to reduce the performance degradation induced by channel evolving, e.g. by a relative movement of the sender or transmitting unit and the receiving unit, which otherwise may induce a significant degradation even in case of moderate speeds.

According to another exemplary embodiment the method further comprises precoding the data packet by using the first precoding matrix. Additionally, the method may further comprise transmitting the data packet precoded by using the first matrix. This transmitting may form the first transmission.

According to another exemplary embodiment of the method the second matrix is calculated or determined taking into account a channel matrix measured at the time of the first transmission of the data packet.

By taking into account a channel matrix measured at the time of the first transmission it may be possible to adapt the second matrix forming a precoding matrix to evolved conditions of the transmission channel.

According to another exemplary embodiment of the method the recoded data are prepared by using a difference between the first matrix and the second matrix.

That is, the difference precoding matrix $\Delta W$ may be used which can be calculated by $\Delta W = W(t_2) - W(t_1)$, wherein $W(t_1)$ represents the first matrix used for precoding, while $W(t_2)$ represents the precoding matrix corresponding to the channel matrix H at the time point of the first transmission. It should be noted that in this application bold characters generally denote vectors or matrixes.

According to another exemplary embodiment of the method the recoded data are prepared by using an interpolation between the first matrix and the second matrix. In particular, a linear interpolation may be used. The interpolation may be calculated as a linear interpolation over a full frame length, which may be 10 ms. Of course the interpolation may be performed by using more than two matrices, e.g. by using all known matrices associated to a predetermined time period.

By using interpolation, e.g. interpolations between two feedback instances may allow to reduce feedback rate significantly. By using more than two matrices as supporting points of the interpolation the result of the interpolation may be improved and thus of the second matrix may be more suitable to enable a high performance transmission.

According to another exemplary embodiment of the method in the preparing of the recoded data packet a scaling factor is taken into account.

The use of such a scaling factor, i.e. by performing an up- and downscaling, in a HARQ transmission may provide an additional interference and noise suppression for other cell interference, at least for the correction term improving overall system performance. In particular, the scaling factor may be adapted or may be chosen in such a way that the scaling factor compensates for the channel evolving between the first transmission and the retransmission. Such a scaling factor may have a small value since typically the channel or radio channel evolves slowly. Thus, the scaling factor may be deducible out of the difference between $W(t_2)$ and $W(t_1)$. In particular, for a signal corresponding to $Tx(t_3)=\Delta W*H_{delay}d*SC$ is retransmitted at the retransmission point in time $t_3$, wherein $\Delta W$ corresponds to $W(t_2)-W(t_1)$, $H_{delay}$ corresponds to the channel matrix at the time $(t_2)$ of the first transmission, and d represents the data packets or data vector. Thus, at the receiving side the signal may be scaled down by a factor 1/SC. Alternatively, $Tx(t_3)$ may be modified to $Tx(t_3)=\Delta W*H_{delay}d+W*H_{delay}d$ so that the combining gain at the receiver may be increased.

According to another exemplary embodiment of the method the error message comprises PMI information. In particular, the error message may be a Non ACKnowledge (NACK) message as known from HARQ schemes which includes additionally some further preferred matrix indices (PMI) information. This additional PMI information may enable a higher signal to interference ration (SIR) and/or an increased decoding probability. Furthermore, the PMI information may be transmitted in the form of ΔPMI information. That is, current PMI information may be compared to previous PMI information and the difference between the same is transmitted together with the error message.

According to another exemplary embodiment of the method the PMI information is used for determining the second matrix. Of course also ΔPMI information may be used to determine the second matrix.

Next, further exemplary embodiments of the communication network element are described. However, these embodiments also apply to the method of transmitting data, the communication network system, the program element, and the computer readable medium.

According to another exemplary embodiment of the communication network element the communication network element is one out of the group of network elements consisting of: a Node B, a user equipment, a base station, and a relay node.

Summarizing an exemplary aspect of the present invention may be the providing of HARQ retransmissions scheme in cooperative antenna systems. Instead of additional redundancy for the data packet the retransmission of the data packet is done by using an optimized precoding matrix W(t2). Optimization may be done with respect to higher quantization level A and PHI or with respect to a time corrected channel matrix $H_{delay}$. In the first case the first PMI feedback of each UE is for example only 3 bit, conform to LTE R8. Only few UEs may succeed in case higher CIR like >10 dB is requested and may have to send therefore a modified NACK message COOPA NACK. COOPA NACK may contain beside the non acknowledge information some further PMI information, so that the overall PMI information is e.g. of length 5 bits. With this additional PMI information a much higher SIR may be achieved and decoding probability is significantly increased. This may help to reduce overall feedback, as only in those cases where high precoding accuracy is required also high number of feedback bits is generated. Calculations show that 100 kbit/s feedback may be sufficient per UE even for very high performance solutions. Thus, a very robust system design for cooperative systems may be possible due to the implementing of a HARQ retransmission scheme. Additionally the possibility for interpolation between two feedback instances may allow to reduce the feedback rate significantly. At the same time the scheme may overcome otherwise significant performance degradations due to feedback delay. In contrast to ARQ schemes in case of HARQ the received data from the first transmission are stored and will be combined suitably with the retransmitted receive signals.

The exemplary aspects and exemplary embodiments defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 5 schematically illustrates achievable SIR.

FIG. 6 schematically illustrates CDF values of achieved SIR.

DETAILED DESCRIPTION

Figure 1:
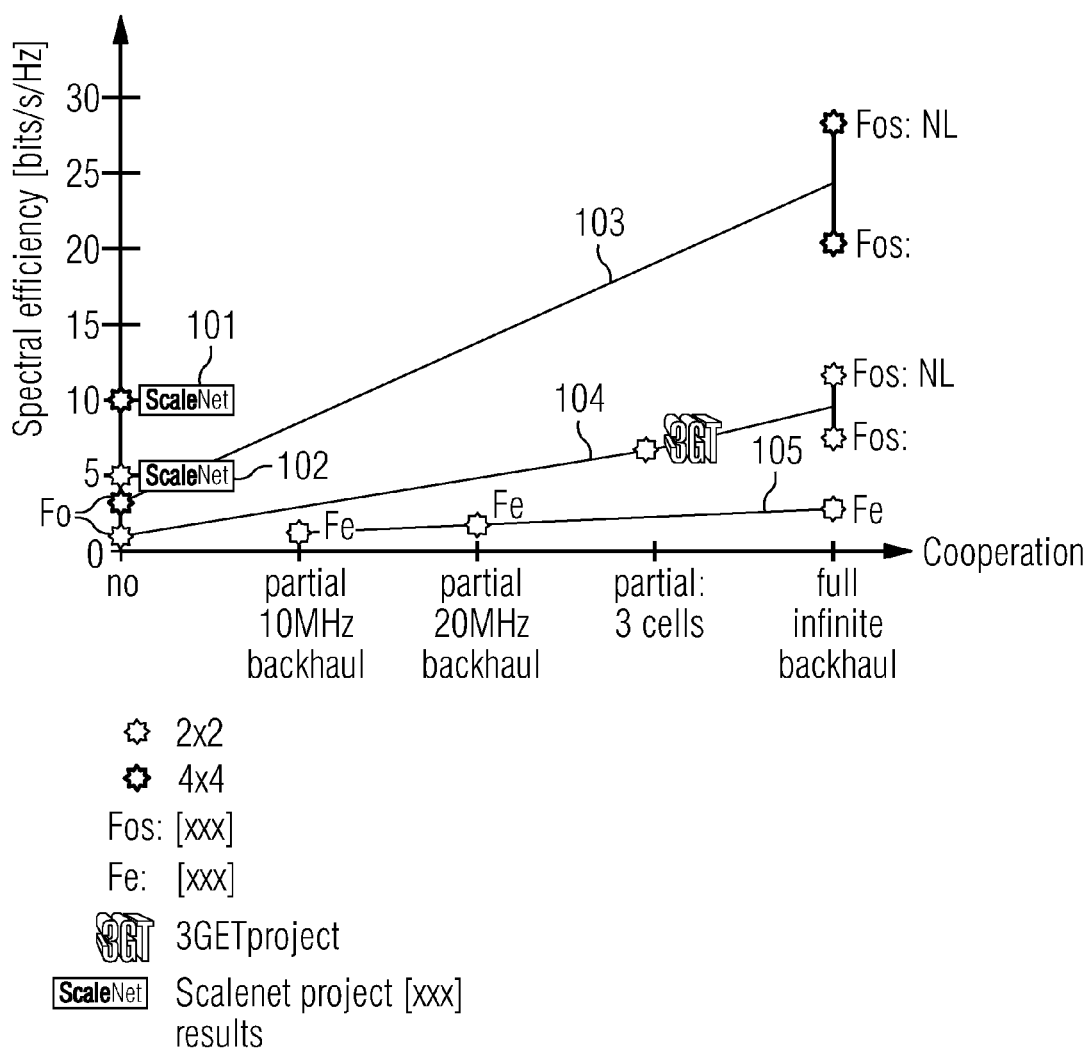
FIG. 1 schematically illustrates potential gains for different degrees of cooperation.

The illustration in the drawing is schematically. Identical or similar elements are labeled with identical or similar reference signs.

In the following, referring to FIGS. 1 to 6, some basic principles and simulation results of a method of transmitting data and communication network elements according to exemplary embodiments will be explained.

FIG. 1 schematically illustrates potential gains for different degrees of cooperation. That is, FIG. 1 shows the spectral efficiency in bits per seconds and hertz (bits/(s*Hz)) over different levels of cooperation. In particular, several schemes are depicted for several degrees of cooperation. The spectral efficiency for the "ScaleNet" results 101 and 102 represent the results for optimum MU-MIMO systems without cooperation but with full channel state information (CSI) knowledge. Furthermore, the "Fo" lines 103 and 104 represent the theoretical upper bounds for each level of cooperation, while the line "Fe" 105 represents the results for a 5 MHz system with varying data rate on X2 between cooperating Node Bs. Form FIG. 1 it can be clearly seen that the spectral efficiency increases with increasing level of cooperation. This is in particular, the case for the "Fo" lines but the "Fe" line 105 as well increases from no cooperation over a cooperation corresponding to 10 MHz backhaul, 20 MHz backhaul, 3 cells and full, i.e. infinite backhaul. Additionally, the result for the 3GETproject is indicated by 106 which represents an active IF management scheme with cooperative areas (CAs) of size 3.

Figure 2:
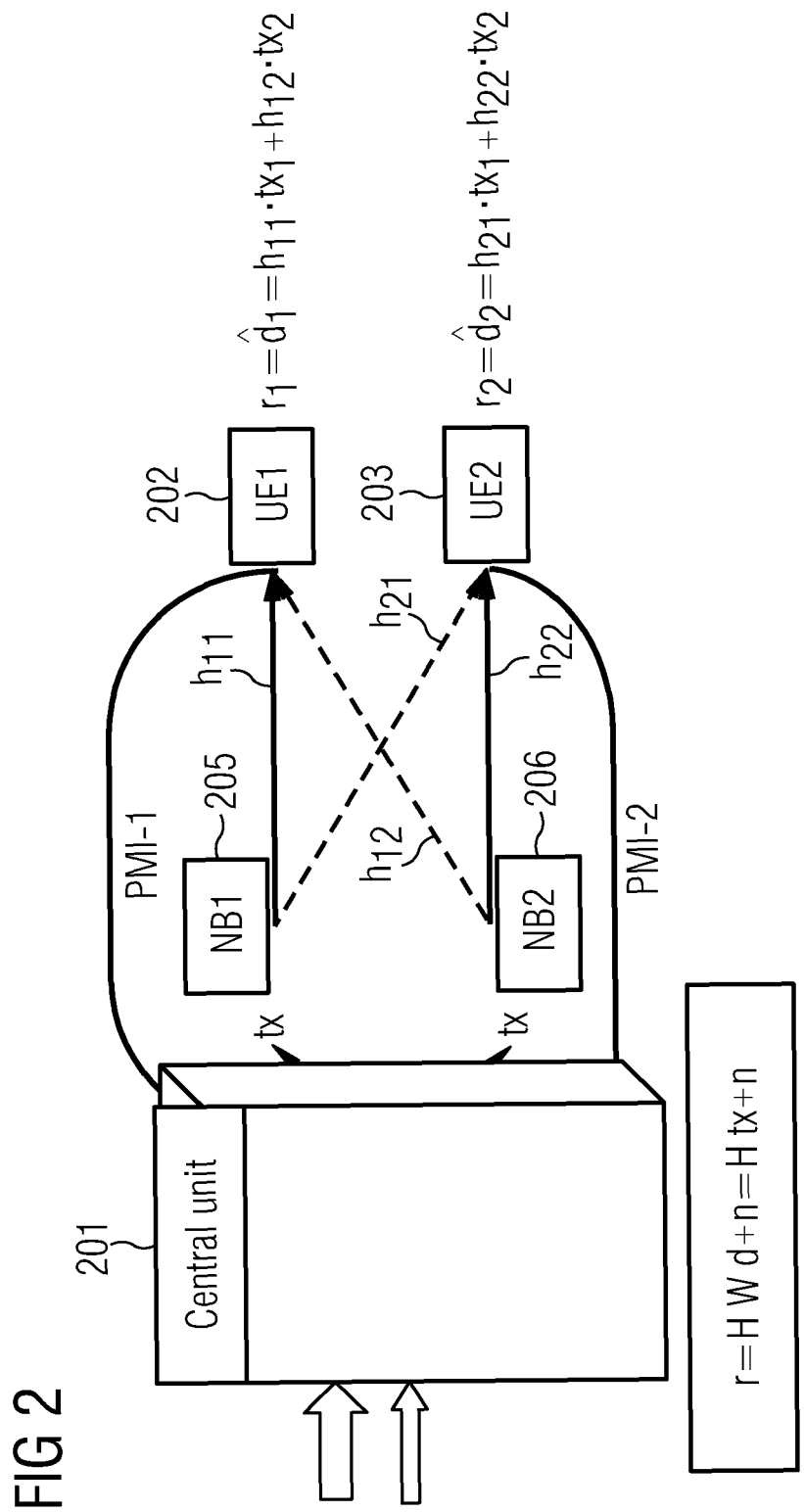
FIG. 2 schematically illustrates a basic solution for cooperative transmission.

FIG. 2 schematically illustrates a basic solution for cooperative transmission which is helpful for the understanding of the present invention. In particular a central unit (CU) 201 performs in downlink (DL) common signal precoding like joint transmission, which is basically a matrix multiplication of all data signals for all cooperating UEs with a precoding matrix W. In case of zero forcing (ZF) W is the pseudo inverse $H^+$ of the overall channel matrix H. The simplest form of a SA for a codebook based precoding is illustrated in FIG. 2. In this case, the precoding matrix W is selected from a codebook based on the different PMI feedbacks PMI1 and PMI2 from the UEs UE1 and 2. Similar concepts can be applied to the uplink (UL) as well, often denominated as joint detection (JD).

In particular, FIG. 2 shows data vector d to be transmitted to UE1 202 and UE2 203. For the common signal processing the data packets are encoded by using the matrix W to form the data signals tx to be transmitted to Node B1 205 corresponding to UE1 202 and Node B2 206 corresponding to UE2 203, where signals $r_1$ and $r_2$ are received, respectively. The signals $r_1$ and $r_2$ correspond to the multiplication of the channel matrix H, the pseudo inverse $H^+$ or W and the data vector d to be transmitted offset by an offset n.

FIG. 3 schematically illustrates simulation results for different precoding strategies. In particular, FIG. 3 shows the performance for different precoding strategies—i.e. LTE based precoding versus quantization of amplitude and phase values with different quantization levels—and the resulting degradation for different feedback delays. The symbol length is similar to LTE, i.e. about 700 µs. In FIG. 3 the cumulative distributed functions (CDFs) of the achievable signal to interference ratios (SIR) for a 2×2 MIMO down link (DL) and OFDM symbols with 100 resource blocks (RBs) have been calculated. The UEs exhibit similar pathloss but different frequency selective radio channels calculated from the SCMe channel model. Noise has been neglected so far as only the precoding accuracy is here of interest.

Figure 3A:
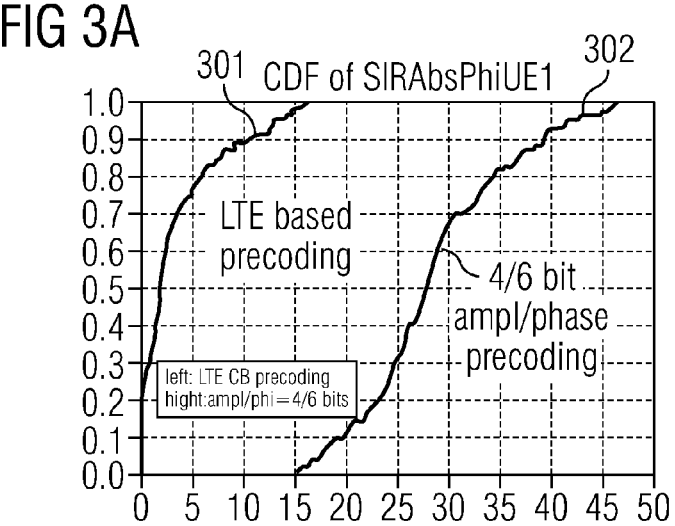
FIG. 3 schematically illustrates simulation results for different precoding strategies.
Figure 3B:
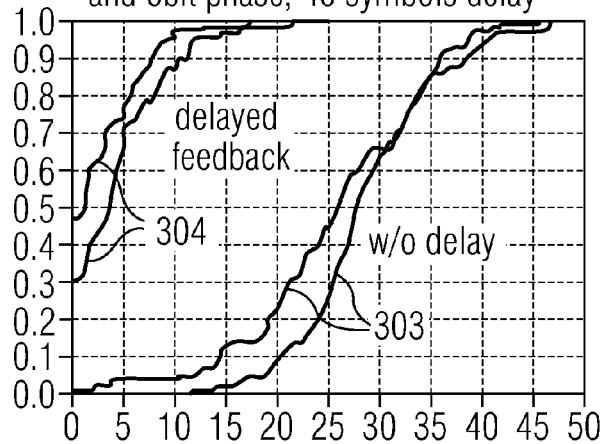
Figure 3C:
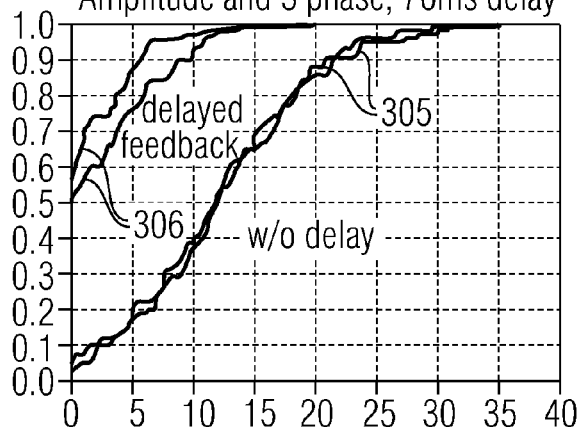

In particular, FIG. 3a shows the CDF of SIR versus Phi of user equipment 1 for LTE base decoding 301 and 4/6 bit ampl/phase precoding 302. FIG. 3b shows the CDF of SIR for 4 bit amplitude and 6 bit phase precoding, and a speed of 30 km/h for undelayed 303 and delayed (40 symbols) feedback 304, wherein the two lines of each pair corresponds to a first and second user equipment, respectively. FIG. 3c shows the CDF of SIR for 2 bit ampl and 3 bit phase precoding, and a speed of 3 km/h for undelayed 305 and delayed (70 ms) feedback 306.

FIG. 3 shows that even for moderate mobile speeds of only 30 km/h and a feedback delay of 40 symbols, which is about 3-4 subframes, significant performance degradations of almost 30 dB can be observed (FIG. 3b).

Faster feedback will be difficult in real systems so feedback delay is a challenging issue for high performance cooperative transmission schemes.

Additionally a comparison between bottom left (FIG. 3c) and top right (FIG. 3b) reveals that for high SIRs in the order of 25 dB (at CDF 50%) there will be required about 10 bit feedback, i.e. 4 bit for amplitude and 6 bit for phase. If such an amount of feedback would be sent every subframe and for each resource block (RB) much too high feedback for practical systems would be generated by the UEs.

Figure 4:
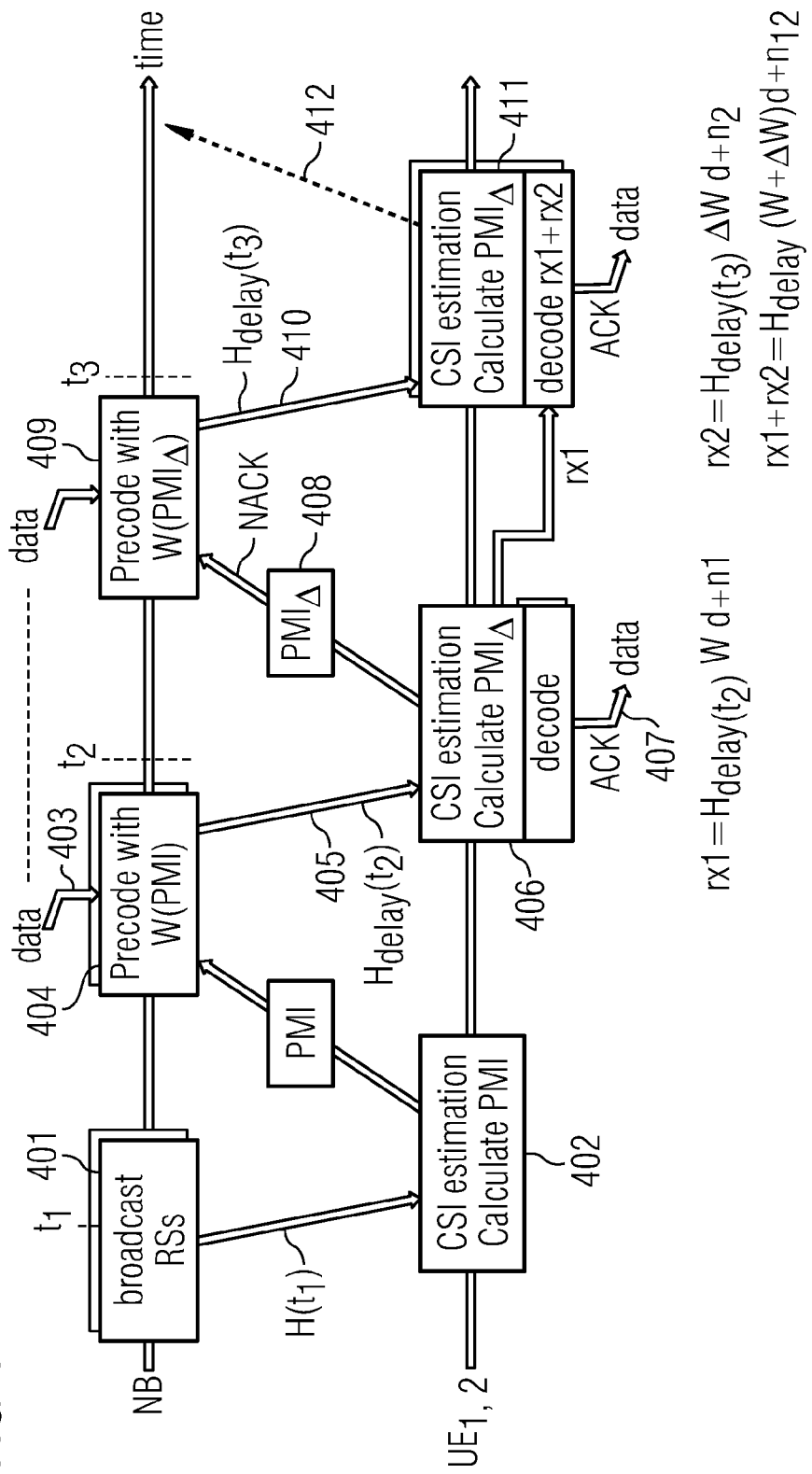
FIG. 4 schematically illustrates a COOPA HARQ scheme according to an exemplary embodiment of the invention.

FIG. 4 schematically illustrates a COOPA HARQ scheme according to an exemplary embodiment of the invention. In particular, FIG. 4 shows some basic processing steps of Node B and user equipments UE1 and UE2 over time of the COOPA HARQ system. At time $t_1$ the NB broadcasts reference signals RSs 401 in order to enable a determination of a channel matrix $H(t_1)$. The UEs receive the broadcasted pilot signals and estimate channel state information and calculate respective preferred matrix indices (PMI) 402. These PMIs are sent to the NB which then can use the same for precoding a data vector 403 using a precoding matrix W(PMI) 404. At a point in time $t_2$ the precoded data vector is transmitted 405 while imposed to an evolved channel which can be described by $H_{delay}(t_2)$. The UEs receive the transmitted data vector and estimate again channel state information and calculate respective difference PMIs (ΔPMIs) 406. Additionally the UEs try to decode the data vector. In case the decoding can be performed an ACKnowledge (ACK) message is send and the data vector can be processed further 407. In case a decoding is not possible the ΔPMI is sent together with a non ACKnowledge (NACK) message to the NB 408. This ΔPMI is then used for a second precoding of the data vector using a precoding matrix W(ΔPMI) 409. At a point in time $t_3$ the recoded data vector is transmitted 410 while imposed to an evolved channel which can be described by $H_{delay}(t_3)$. The UEs receive the transmitted recoded data vector and estimate again channel state information and calculate respective difference PMIs (ΔPMIs) 411. Additionally the UEs try again to decode the data vector while using the firstly transmitted data vector labeled rx1 in FIG. 4 and as well as the transmitted recoded data vector.

The steps can be repeated several times in order to ensure a correct decoding of the data vector which is indicated by the dashed arrow 412 in FIG. 4.

It should be noted that in case of significant feedback delay Δτ between the time $t_1$ of measuring $H(t_1)$ and transmitting the data packet over the radio channel at time $t_2=t_1+\Delta\tau$, the radio channel will have evolved into the radio channel $H_{delay}(t_2)$. So precoding with $W(t_1)H_{delay}(t_2)$ will go wrong as can be seen also from the simulation results. For COOPA HARQ the UE can measure $H_{delay}(t_2)$, which has been the radio channel for the first transmission and can therefore adapt its PMI feedback accordingly, either by calculating the difference of $\Delta W=W(t_2)-W(t_1)$ itself or by feeding back $W(t_2)$ so that the NB can calculate the difference. At the retransmission the central unit (CU) transmits Tx $(t_3)=\Delta W^*H_{delay}d$, wherein d is the same data vector as for the first transmission. The UEs combine both received signals from $t_2$ and $t_3$ to $r_{sum}=r(t_2)+r(t_3)=(W(t_1)\ H_{delay}(t_2)+\Delta W^*H_{delay})d=W(t_2)H_{delay}(t_2)d$. It should be noted that the equation is true if $H_{delay}$ and $H_{delay}(t_2)$ are equal, otherwise there will be only partial correction. However, this technique may nonetheless very advantageous as it allows correcting precoding errors after transmission has already taken place.

Moreover, this technique may allow for interpolation between both time instances $t_2$ and $t_3$ and according evaluations have revealed that even very simple linear interpolation over a full frame length of 10 ms is possible, while performance degradations compared to a constant radio channel are even for the mid of the frame relatively small. Note interpolation accuracy will be smallest at center of the frame if correct precoding is assumed for beginning and end of the frame.

This can be seen from FIG. 5, where the achievable SIR over the time in number of subframes of length 1 ms is being shown. 5% as well 50% CDF values of the SIR are depicted for a conventional system without correction of feedback delays and for a COOPA HARQ system and interpolation between a correct channel estimation at the beginning of the radio frame and one at the end of the radio frame after 10 ms.

As already mentioned the largest degradation can be found in the middle of the frame where the interpolation error is maximal.

A significant reduction of feedback overhead may be achieved while keeping a high performance as there is only one feedback per radio frame required.

The relative overall Tx power of $\Delta W$ compared to W has been analyzed with respect to $\Delta \tau$ and mobile speed as well as feedback delay. For moderate scenarios values of $\Delta W$ will be small and in the order of $-10$ to $-20$ dB as the radio channel typically evolves slowly. For this reason it may be possible to either retransmit $Tx(t_3)=\Delta W^*H_{delay}d^*SC$ where SC is a proper scaling factor so that at the receiver the signal can be scaled down by 1/SC or to modify $Tx(t_3)$ to $Tx(t_3)=\Delta W^*H_{delay}d+W^*H_{delay}d$, increasing the combining gain at the receiver.

Further optimization in combination with partial IRC at the UEs has been analyzed as well, reducing the SDF at UE side to other cell interference partly, but at the same time stabilizes the overall system further.

FIG. 6 schematically illustrates CDF values of achieved SIR. In particular, FIG. 6a shows CDFs for achieved SIR for two UEs without interpolation. Thereby lines 601 represent the delayed case (delay 140 symbols and an FB delay of 10 ms) and ampl/phase precoding of 5/7 bits and by a speed corresponding to 3 km/h. As a comparison lines 602 indicate the CDFs without delay. FIG. 6b shows CDFs for achieved SIR for the two UEs with interpolation for worst case FB delay of 5 ms. Thereby lines 603 represent the delayed case (delay 70 symbols at 700 µs) and by a speed corresponding to 3 km/h. As a comparison lines 604 indicate the CDFs without delay. FIG. 6c shows CDFs for achieved SIR for the two UEs with interpolation for FB delay of 10 ms. Thereby lines 605 represent the delayed case (delay 126 symbols at 700 µs) and by a speed corresponding to 3 km/h. As a comparison lines 606 indicate the CDFs without delay.

Summarizing some of the main advantages of a method according to an exemplary embodiment may be:

a) Significantly reducing of the required feedback overhead with small performance loss. Calculations show that 100 kbit/s feedback should be sufficient per UE even for very high performance solutions. The reason is that larger feedback is only generated if required. Additionally the possibility for interpolation between two feedback instances allows to reduce the feedback rate significantly. At the same time the method may overcome otherwise significant performance degradations due to feedback delay.

b) Due to HARQ retransmissions a very robust system design for cooperative antenna systems may be possible.

c) In case of up- and downscaling of the HARQ retransmissions there will be additional interference and noise suppression for other cell interference, at least for the correction term improving overall system performance.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS

101 ScaleNet results
102 ScaleNet results
103 Fo result
104 Fo result
105 Fe result 201 Central unit
202 User equipment 1
203 User equipment 2
205 Node B1
206 Node B2
301 CDF of SIR for LTE base decoding
302 CDF of SIR for 4/6 bit ampl/phase precoding
303 CDF of SIR for undelayed feedback
304 CDF of SIR for delayed feedback
305 CDF of SIR for undelayed feedback
306 CDF of SIR for delayed feedback
401 Broadcasting RSs
402 CSI estimation, Calculating of PMI
403 Data vector
404 Precoding using W(PMI)
405 Transmitting data vector
406 CSI estimation, Calculating of $\Delta$PMI
407 Sending ACK message
408 Transmitting NACK message and $\Delta$PMI
409 Recoding data vector
410 Transmitting recoded data vector
411 CSI estimation, Calculating of $\Delta$PMI
412 Arrows indicating repetition
601 Lines representing delayed case
602 Lines representing undelayed case
603 Lines representing delayed case
604 Lines representing undelayed case
605 Lines representing delayed case
606 Lines representing undelayed case

The invention claimed is:

1. A method of transmitting data to user equipments in a communication network, the method comprising:
    receiving a non-acknowledgement message, comprising a difference of preferred matrix indices information, indicating that a data packet precoded by using a first matrix and transmitted a first time by using a cooperative transmission scheme is not decoded correctly, where the cooperative transmission scheme is performed by a central unit performing a common signal precoding wherein a matrix multiplication is performed of all data signals to be transmitted to all cooperating user equipments with a precoding matrix;
    determining a second matrix using the preferred matrix indices information;
    preparing a recoded data packet by precoding the data packet using the second matrix, wherein the second matrix is different from the first matrix, wherein in the preparing of the recoded data packet a scaling factor is taken into account,
        wherein the scaling factor is adapted to compensate for the channel evolving between the first transmission and the retransmission,
        wherein the scaling factor is determined by $SC=Tx(t_3)/\Delta W^*H_{delay}d$,
        wherein $Tx(t_3)$ corresponds to the relative overall transmit power at the time point of transmitting the recoded data packet,
        wherein $\Delta W$ is a difference precoding matrix, calculated by $\Delta W=W(t_2)-W(t_1)$,
        wherein $W(t_1)$ represents the first matrix used for precoding, while $W(t_2)$ represents the precoding matrix corresponding to the channel matrix H at the time point of the first transmission,
        wherein $H_{delay}$ corresponds to the channel matrix at the time $(t_2)$ of the first transmission, and d represents the data packets, and wherein the second matrix is based on a time corrected channel matrix which considers the evolution of the channel over a time period between calculating the first matrix and the first transmission; and retransmitting the recoded data packet.

2. The method according to claim 1, further comprising: precoding the data packet by using the first matrix.

3. The method according to claim 1, further comprising: transmitting the data packet precoded by using the first matrix.

4. The method according to claim 1, wherein the recoded data packet is prepared by taking into account a difference between the first matrix and the second matrix.

5. A computer program product comprising a non-transitory computer-readable medium, in which a computer program is stored which, when being executed by a processor, is adapted to control or carry out transmitting data in a communication network as described in the method of claim 1.

6. A network element, for transmitting data to user equipments in a communication network, comprising:
   a detection unit adapted to detect a non-acknowledgement message, comprising a difference of preferred matrix indices information, indicating that a data packet precoded by using a first matrix and transmitted a first time using a cooperative transmission scheme on a first channel is not decoded correctly, where the cooperative transmission scheme is performed by a central unit adapted to perform a common signal precoding wherein a matrix multiplication is performed of all data signals for all cooperating user equipments with a precoding matrix;
   a processor unit adapted to determine a second matrix using the preferred matrix indices information;
   a precoding unit adapted to preparing a recoded data packet by precoding the data packet using the second matrix which is different to the first matrix, wherein in the preparing of the recoded data packet a scaling factor is taken into account,
      wherein the scaling factor is adapted to compensate for the channel evolving between the first transmission and the retransmission,
      wherein the scaling factor is determined by $SC=Tx(t_3)/\Delta W*H_{delay}d$,
      wherein $Tx(t_3)$ corresponds to the relative overall transmit power at the time point of transmitting the recoded data packet,
      wherein $\Delta W$ is a difference precoding matrix, calculated by $\Delta W=W(t_2)-W(t_1)$,
      wherein $W(t_1)$ represents the first matrix used for precoding, while $W(t_2)$ represents the precoding matrix corresponding to the channel matrix H at the time point of the first transmission,
      wherein $H_{delay}$ corresponds to the channel matrix at the time $(t_2)$ of the first transmission, and d represents the data packets, and
      wherein the second matrix is based on a time corrected channel matrix which considers the evolution of the channel over a time period between calculating the first matrix and the first transmission, and
   a transmission unit adapted to retransmit the recoded data packet.

7. The communication network element according to claim 6, wherein the network element is one out of the group of network elements consisting of:
   a Node B,
   a user equipment, a base station, and
   a relay node.

8. A communication network system comprising:
   a plurality of communication network elements,
   wherein the plurality of communication network elements includes at least two base stations and at least two user equipments,
   wherein at least one communication network element, is a communication network element according to claim 6, and
   wherein the plurality of communication network elements are adapted to perform a cooperative transmission of data packets.

9. A method comprising:
   transmitting a first data packet by a base station of at least two base stations in a communications network,
      wherein the transmitting uses a cooperative transmission scheme, wherein a central unit performs a common precoding for the at least two base stations, and
      wherein the first data packet is precoded by calculating a first matrix,
   receiving and decoding the first data packet by a user equipment of at least two user equipments in the cooperative communication scheme;
   receiving a non-acknowledgement message, comprising a difference of preferred matrix indices information, that the first data packet was decoded incorrectly;
   precoding a second data packet by calculating a second matrix,
      wherein the second matrix is different from the first matrix,
      wherein the preferred matrix indices information is used for determining the second matrix, and
      wherein the second matrix is based on a time corrected channel matrix which considers the evolution of the channel over a time period between the calculating of the first matrix and the transmitting of the first data packet; and
   transmitting the second data packet, wherein prior to transmission a scaling factor is taken into account,
      wherein the scaling factor is adapted to compensate for the channel evolving between the first transmission and the retransmission,
      wherein the scaling factor is determined by $SC=Tx(t_3)/\Delta W*H_{delay}d$,
      wherein $Tx(t_3)$ corresponds to the relative overall transmit power at the time point of transmitting the recoded data packet,
      wherein $\Delta W$ is a difference precoding matrix, calculated by $\Delta W=W(t_2)-W(t_1)$,
      wherein $W(t_1)$ represents the first matrix used for precoding, while $W(t_2)$ represents the precoding matrix corresponding to the channel matrix H at the time point of the first transmission, and
      wherein $H_{delay}$ corresponds to the channel matrix at the time $(t_2)$ of the first transmission, and d represents the data packets.

10. The method according to claim 9, wherein the transmitting and the receiving and the decoding can be done by, in addition to the base station and the user equipment, any network element of a plurality of network elements within the cooperative transmission scheme.

* * * * *